US008843618B2

(12) United States Patent
Li

(10) Patent No.: US 8,843,618 B2
(45) Date of Patent: Sep. 23, 2014

(54) CLOUD SERVICE INFORMATION OVERLAY

(75) Inventor: Hong Li, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 12/954,366

(22) Filed: Nov. 24, 2010

(65) Prior Publication Data

US 2012/0130781 A1 May 24, 2012

(51) Int. Cl.
*G06F 15/16* (2006.01)
(52) U.S. Cl.
USPC .......................................... 709/224
(58) Field of Classification Search
CPC ................. H04L 41/0213; G06Q 30/0202
USPC .......................................... 709/224
See application file for complete search history.

(56) References Cited

U.S. PATENT DOCUMENTS

| | | | | |
|---|---|---|---|---|
| 2005/0177724 | A1* | 8/2005 | Ali et al. | 713/168 |
| 2006/0116912 | A1* | 6/2006 | Maes | 705/4 |
| 2006/0116981 | A1* | 6/2006 | Krimmel et al. | 707/2 |
| 2008/0208548 | A1* | 8/2008 | Metzger et al. | 703/6 |
| 2011/0295727 | A1* | 12/2011 | Ferris et al. | 705/34 |

OTHER PUBLICATIONS

"Intel's Vision of the Ongoing Shift to Cloud Computing", IDC Server Workloads Forecast and IDC the Internet Reaches Late Adolescence, 2010, pp. 1-4.
Keromytis et al., "SOS: Secure Overlay Services", Proceedings of SIGCOMM 2002, Aug. 19-23, 2002, 12 pages.
Clark et al., "A Knowledge Plane for the Internet", ACM SIGCOMM 2003, Conference on Applications, technologies, architectures, and protocols for computer communications, Aug. 25-29, 2003, pp. 3-10.

* cited by examiner

*Primary Examiner* — Bryan Lee
(74) *Attorney, Agent, or Firm* — Grossman, Tucker, Perreault & Pfleger, PLLC

(57) ABSTRACT

In some embodiments, the invention involves collecting service health information from a plurality of cloud service provider associated with a customer. Once the service health information is collected, aggregating information from multiple providers, when necessary, and providing a service health report to the customer. The customer has agreements with both the service providers and information collector to receive a level of service health information regarding services provided. The information collector may have agreements with the service providers to retrieve or receive the requested service health information for the customers via a pre-agreed upon protocol. Other embodiments are described and claimed.

29 Claims, 3 Drawing Sheets

CLOUD SERVICE INFORMATION OVERLAY

FIELD OF THE INVENTION

An embodiment of the present invention relates generally to computer resource (compute, storage, network) monitoring and, more specifically, to an overlay in a network to enable monitoring and analysis of a plurality of cloud computing resources used by clients.

BACKGROUND INFORMATION

Various mechanisms exist for deploying cloud computing services. Cloud computing is network, typically Internet-based, computing, where shared resources, software and information are provided to computers and other devices on-demand. Industry trend and vision of one pioneer in the field of cloud computing may be found on the Internet at URL www*intel*com/Assets/PDF/whitepaper/cloud_vision.pdf, in the White Paper: "*Intel's Vision of the Ongoing Shift to Cloud Computing*," published in 2010, where periods are replaced by asterisks to avoid unintentional hyperlinks.

However, one of the challenges that limits the adoption of a "public" cloud is the lack of ability to monitor the health of the services provided by the cloud. Today, cloud customers need to rely entirely on the service level agreement (SLA) made with the provider. These SLAs are often insufficient for some customer tiers (e.g., enterprise IT) who need to have a certain level of visibility into how the cloud service is provisioned and maintained. This transparency is important for the purposes of compliance auditing, contingency under service interruption, for instance, Denial of Service (DoS), storing sensitive information on foreign servers, performance compliance with an SLA, etc. This lack of transparency and monitoring information also provides a challenge for cloud service providers because it is difficult to provide such monitoring function to individual customers while providing services in a multi-tenant fashion. Furthermore, enterprise IT ventures may need to subscribe to different services from different cloud providers to fulfill one business function (e.g., supply chain). The ability to monitor the overall health of the enterprise process would be extremely helpful yet almost impossible today.

BRIEF DESCRIPTION OF THE DRAWINGS

The features and advantages of the present invention will become apparent from the following detailed description of the present invention in which.

DETAILED DESCRIPTION

Embodiments of the present invention addresses the challenge of monitoring the health of an enterprise which used cloud resources by providing a cloud service information overlay that may be utilized by both the cloud service providers and customers. The cloud service information overlay may provide on-demand and customized information on the service health. Elements of service health that may be monitored and reported upon include, but are not limited to resource usage, such as network bandwidth, storage capacity, virtual machine (VM) usage, compute resources, location of resources; capacity available, such as size of storage available, network bandwidth available, servers available for computing, network; performance, such as MIPS available/used, transactions per second; compliance with SLA or security requirements and protection against malware; events/alerts, etc.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
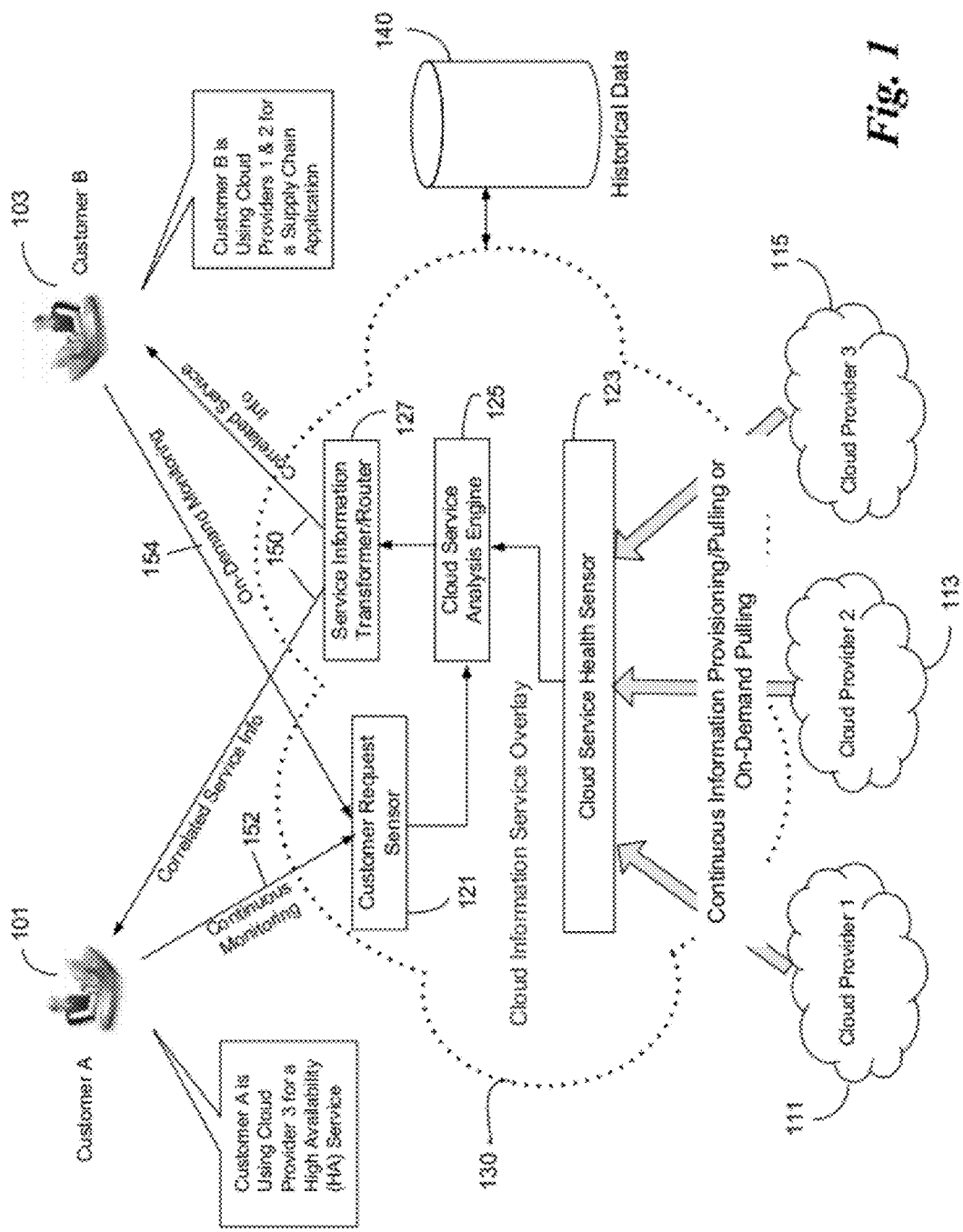
FIG. 1 is a block and flow diagram illustrating a cloud information service overly and interaction of exemplary components, according to an embodiment of the invention.

FIG. 1 is a block diagram illustrating components of an exemplary cloud service information overlay, according to an embodiment of the invention. In an embodiment of the invention, both the cloud service providers and cloud customers "subscribe," typically via the Internet, to the "cloud service information overlay." This overlay may be in the form of a network overlay; a knowledge plane; an information bus, or a cloud service provider.

Secure overlay services may be used to allow secure communication between the cloud providers and third parties to share service health information. An example of an existing secure overlay service for use in other applications may be found in the article: "*SOS: Secure Overlay Services*," by Keromytis, et al. [Aug. 19-23, 2002, SIGCOMM '02].

A knowledge plane may be utilized as a separate construct that creates, reconciles and maintains the many aspects of a high-level view of the network, and then provides services and advice as needed to other elements of the network. In an embodiment of the invention, a knowledge plane is used to make service health data available to third parties. An example of a type of knowledge plane used for other applications may be found in the article: "*A Knowledge Plane for the Internet*," by Clark et al., [Aug. 25-29, 2003, SIGCOMM'03].

An information bus is a common bus on which information may be written and shared. A variety of information bus interfaces are available for other applications, for instance from TIBCO Software Inc., Palo Alto, Calif.

However, these aforementioned examples of a network overlay (SOS), knowledge planes *Knowledge Plane for the Internet*, information bus implementations (TIBCO software) don't provide the capabilities for the cloud as necessary for collecting, aggregating and reporting on service health information, as described herein. Specifically, the SOS and knowledge plane solutions cited were not designed to be provisioned as cloud management services that customers can subscribe to, but were proposed as specific network overlays among collaborative Internet nodes. The software available from TIBCO does not have the ability to provide correlated service monitoring in a distributed customer environment in the cloud across the internet, but was designed as an enterprise information bus for service integration in an IT enterprise.

Referring to FIG. 1, there is shown Customer A 101 using Cloud Provider 3 (111) for a high availability (HA) service, and Customer B 103 using Cloud Providers 1 and 2 (113, 115) for a supply chain application. In this exemplary embodiment, Customer A 101 requests continuous monitoring 152, and Customer B 103 requests on-demand monitoring 154. Correlated service information 150 is sent to the customers based on the type of monitoring requested.

Components inside the overlay cloud 130 include sensors connected to service providers (cloud providers), as well as, those connected to the customers: service health analysis engine (information aggregator/correlator) 125, and information router 127. The cloud information service overlay 130 supports both continuous monitoring requests 152 and also customer on-demand requests for information 154. In this exemplary embodiment, Customer A 101, requires continuous event monitoring and alert reporting so that it can prepare for unexpected service interruptions, and Customer B 103 requires only ad hoc reporting, triggered by an on-demand auditing request 154. In an embodiment, Customer B 103 may obtain information about the overall use of its services, which is a composite application utilizing two cloud service providers (111, 113). The requirement for composite or aggregate reporting requires the cloud analysis engine 125 in the service overlay 130 to be able to aggregate the service health information from all cloud service providers utilized by Customer B 103 and also respond to the customer A 101 with correlated service health information. The service overlay 130 may obtain service health information from cloud providers, via a cloud service health sensor 123. The service health sensor 123 may collect the health information by either (a) periodically pulling information using standard monitoring templates, (b) the service providers periodically provision health information to the cloud service health sensor 123 (for instance, via API plug-in's), or (c) generate an ad-hoc request for specific monitoring data based on customer requests (on-demand).

A number of financial, marketing or subscription models may be used without diverging from embodiments of the invention described herein. For instance, a third party (not a customer or cloud provider) may deploy and operate the cloud service health sensor 130. In another embodiment, the "third party" may also be a customer or cloud provider. This operator may herein be referred to as a cloud health information provider (CHIP), for simplification purposes. The CHIP may hold separate service contracts with various cloud service providers related to collection and storage of historical data. Each cloud provider may allow a different level of information to be made available for customer usage, or charge varying fees based on the completeness, robustness/granularity and/or amount of historical data made available.

Historical data may be stored in a non-volatile memory store 140. In another embodiment, the CHIP may only provide continuous monitoring services and store health data in a temporary volatile storage location until it is transmitted to the customer. In another embodiment, on-demand requests may be a system for turning on and off continuous monitoring at a desired point in time and information may be stored as pass-through information stored in a volatile memory store, or be retrieved from a non-volatile data store as historical information. Implementation of data storage by the CHIP may vary by vendor, or based on agreements with the cloud providers and/or customers.

More than one CHIP may operate simultaneously with the same cloud providers and/or customers. Customers may have agreements only with the CHIP, or be required to have an agreement with the CHIP for providing aggregated service health information, as well as, have agreement with each cloud provider utilized regarding information to receive. It will be apparent to those of skill in the art, that a variety of business models may be used in order to provide required service health information to the customers, and that collection policies may be enforced on either or both the cloud provider system, as well as the CHIP system to ensure that the customer is entitled to the requested service health information, and at what level the information is to be provided, and at what periodicity, etc.

In an embodiment, The CHIP serves as collector of information by sending requests to the cloud providers and pulling information from the cloud provider servers. In this case, the cloud provider may need to store the service health information in a memory store accessible to the CHIP. In another embodiment, the cloud provider will send information to the CHIP at each request. The information may be tagged with identifying information such as time stamp, customer name or identification code, service(s) provided and health information, such as resource usage, throughput, available/used bandwidth, capacity, performance, compliance, service alerts/events, etc.

In another embodiment, cloud providers may periodically push the service health data directly to the CHIP in the form of informational messages with identifying information along with the service health information, as described above. In another embodiment, the cloud providers may have access to the historical data store 140 and directly store the service health information in an appropriate location based on a pre-arranged format.

The service health information for an authorized customer may be retrieved by a cloud service health sensor 123 operated by the CHIP, either retrieved in an information message or retrieved from the data store 140. Service health information may be sent directly to an analysis engine 125 when received, or stored for a period of time as historical data in a memory store 140. The service health sensor may reformat the service health information before storage, based on agreements with customers.

In a case where a customer uses only a single cloud provider, the service health information may be just rebundled by the cloud service analysis engine or reformatted to a more readable format and then routed to the customer via a service information transformer/router. Based on the customer's needs, the information may go through a more historical analysis over time and various charts, histograms or other reports may be generated by the analysis engine 125 before being routed 127 to the customer.

When the customer utilizes more than one service and/or cloud provider, the analysis engine 125 may aggregate the data in a variety of fashions to provide the customer with an overall picture of the health of their cloud computing usage. It will be apparent to those of skill in the art that any number of methods may be used to analyze and bundle the information for customer use, and that varying levels of analysis and reporting may be based on different levels of service agreements on a customer to customer basis.

In the example as shown in FIG. 1, Customer A 101 sends a request to the CHIP for continuous monitoring 152. A customer request sensor 121 may be used by the CHIP to receive the monitoring request and ensure that the request is authorized based on cloud provider policies, available information and agreements with the customer. In an embodiment, the request may be for overall continuous monitoring, or continuous monitoring of only a subset of the possible available service health information. For instance, the customer may be interested in continuous monitoring of bandwidth available/used and only infrequent monitoring of storage capacity used.

In another embodiment, the customer request may be pre-wired as associated with the SLAs between the customer and the cloud provider, and between the customer and the CHIP. In this case, the request is made a part of the collection and reporting policies at the cloud provider and CHIP and no additional requests are necessary from the customer.

The customer request sensor 121 may check policies and agreements and customer authorization and then set a variety of parameters for monitoring for use by the service health sensor 123 and the analysis engine 125. Data is then collected or requested, and analyzed and bundled, based on the customer request. In the case of continuous monitoring, the service health sensor 121 may send the data directly to the analysis engine 125 without storing historical data. Maintaining historical data requires additional resources (e.g., capacity in a data store 140) that may require an additional level of service agreement between the CHIP and customer.

In the example as shown in FIG. 1, Customer B 103 sends a request to the CHIP (121) for on-demand monitoring 154. In one embodiment, this request may amount to a request to turn on continuous monitoring at the time requested. Continuous monitoring, as described above, may then commence at the time requested, or at a time defined in the request message. Continuous monitoring may then proceed until another on-demand request is sent to turn off the monitoring, or at an end time defined in the on-demand request. It will be understood by those of skill in the art that various types of on-demand requests may be implemented.

In another embodiment, the on-demand request may be for historical service health information captured for a requested historical time frame. In this case, the customer may have an agreement that the service health sensor 123 is to collect the requested information and store it for later analysis in the data store 140. The customer request sensor 121 may then send a request to the service analysis engine 125 which will retrieve the requested data from the data store 140, and perform the appropriate analysis. After performing the requested analysis on the historical information, the analysis engine 125 then sends the reports to the router 127 for transmission to the customer. The router/transformer 127 may further reformat the reports based on customer policy and agreement. In an embodiment, the analyzed data may be sent directly to the customer in a wired or wireless transmission. In another embodiment, the analyzed data may be stored in a location accessible to the customer and then pulled by the customer, when desired. A notice that the information is ready to be pulled may be sent to the customer in some cases. In other cases, the customer may periodically check the accessible location for new analyzed data.

In another embodiment, the analysis performed by the cloud service analysis engine may include generating recommendations for service or cloud provider modifications. For instance, the analysis engine may determine, based on service health information retrieved from multiple cloud providers, that the customer may improve performance, throughput, bandwidth, capacity, etc., or remove bottlenecks in the enterprise process by modifying service agreements with a specific cloud provider, or by switching providers altogether. In some cases, the recommendation may be to use the same provider, but an alternative service. This recommendation service, or parts thereof, may be provided by the CHIP at additional cost to the customer, or may be prohibited by the cloud provider in exchange for allowing its service health information to be retrieved by the CHIP. It will be understood by those of skill in the art that any number of policies may be implemented and enforced based on financial models of the cloud providers and CHIPs. In another embodiment, a cloud provider may pay the CHIP a fee (or reduce its fee charged to the CHIP for providing service health information) in order to provide advertising in the recommendation reports to the customers send by the CHIP.

Figure 2:
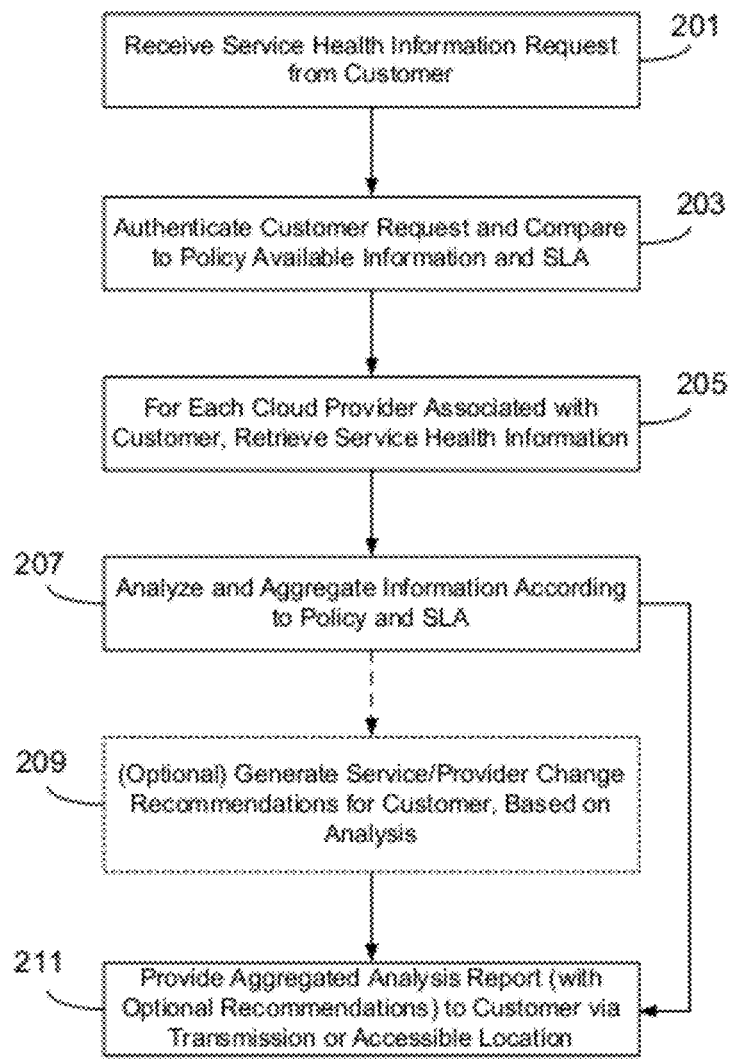
FIG. 2 is a flow diagram illustrating an exemplary method for acquiring and reporting on aggregated service health information by a cloud health information provider, according to an embodiment of the invention.

Referring now to FIG. 2, there is shown a flow chart of an exemplary method for providing service health information, according to one embodiment of the invention. The cloud health information provider (CHIP) receives a request from a customer for either continuous or on-demand service health information reporting, in block 201. In an embodiment, this is a transmitted request. In another embodiment, the request is bundled with the monitoring and reporting policies of the CHIP, based on a pre-arranged agreement with the customer.

The CHIP verifies that the customer is authorized to receive the requested information, in block 203. It will be apparent to those of skill in the art that this authentication may take on a variety of forms. In one embodiment, the customer may log in to a user interface provided by the CHIP with a user ID and password. A token such as a security fob or random number generator may also be required. In another embodiment, the customer may send a digitally signed message to the CHIP with the request. Other authentication and verification methods may be used, and the method may vary by CHIP vendor. In an embodiment where the request is pre-arranged and part of the CHIP policy, this verification may be to check a previously stored digital signature stored in a secure location or may be as assumed verification based on the policy settings.

For each cloud provider and service associated with the customer, the CHIP may retrieve or request the information from the cloud provider, in block 205, as discussed above. Once the information is received/retrieved, the appropriate service health information is sent to the analysis engine and aggregated and analyzed according to policy or service level agreement, in block 207.

In some embodiments, the aggregated and analyzed information may be further analyzed to provide service or provider modification recommendations, in block 209. As an incentive for the cloud provider to be willing to provide the service health information to its customers using embodiments of this invention, this optional step may be prohibited by the cloud provider based on agreements with the CHIP and/or customer. Cloud providers may not want the CHIP to be able to recommend that the customer switch service providers away, but may want the CHIP to be able to recommend switching to that service provider or upgrade service to a more expensive service from the same provider.

Once the analysis, or health report is generated, the CHIP may then send or provide the report to the customer, in block 211.

It will be apparent to those of skill in the art that various standards and protocols may be developed to standardize the methods for making customer report requests or providing the raw health information data to the CHIP. A cloud service provider or CHIP may continue to use a proprietary method for making the information available or choose to conform to a standard protocol. It is important that the cloud provider notify the CHIP of customers authorized to receive service health information and policies regarding which data may be provided to which customers, and at what periodicity. Various pricing schemes and models may be used. For instance, the customer may be required to pay a fee to both the cloud provider and the CHIP in order to receive service health data. In another embodiment, the customer pays the cloud provider only for the service and pays the CHIP a different fee for varying levels of reporting, where the CHIP pays a fee to the cloud provider to retrieve/receive the data. Other fee structures and models may be used to meet the vendors' varying financial models.

Referring again to FIG. 1, it will be understood by those of skill in the art that the various components (121, 123, 125, 127) of the cloud information service overlay 130 may be separate modules that co-exist in the same physical system, reside in one or more protected virtual machines or embedded processors, or be distributed to more than one physical computing system without diverging from embodiments of the invention described herein.

In an embodiment, the cloud information service overlay may be provided as a "cloud service" that can be consumed just as any other cloud services. The overlay may be a cooperative effort by multiple players, similar to the idea of a knowledge plane which requires the cooperation of many players on the internet. In another embodiment, different cloud service providers provide different components of the overlay service and a "service integrator" coordinates and aggregates the distributed components for a customer, as another cloud service provider.

In an embodiment, portions or all of the overlay 130 may be provided by a cloud provider. For instance, each cloud provider may install a cloud service health sensor component which stores the raw service health data in a data store 140 which is accessible by various CHIP vendors for retrieval of the data to perform analysis. It will be understood that even though only one data store 140 is illustrated in FIG. 1, that there may be a plurality of data stores. For instance, each data store may be dedicated to a specific cloud provider, or multiple cloud providers may have dedicated storage on the same physical data store device. It will be further understood that in embodiments may differ only in which entity develops and provides the various components of the cloud information service overlay. It will be understood that responsibility for maintain and controlling the various components may be distributed among any number of customers, cloud providers and CHIPs. In some cases, an entity may act as more than one type of entity. For instance, a customer of a cloud service from cloud provider 1, may also be a cloud provider to customer A. Cloud provider 2 may also provide the all or a portion of the service overlay, and therefore be a CHIP, as well.

It will also be understood that the connection between a customer and CHIP or CHIP and cloud provider may be via wired or wireless means, and may be over the Internet or a proprietary network connection. Various entities may connect to other entities in different ways in the same overall system.

Figure 3:
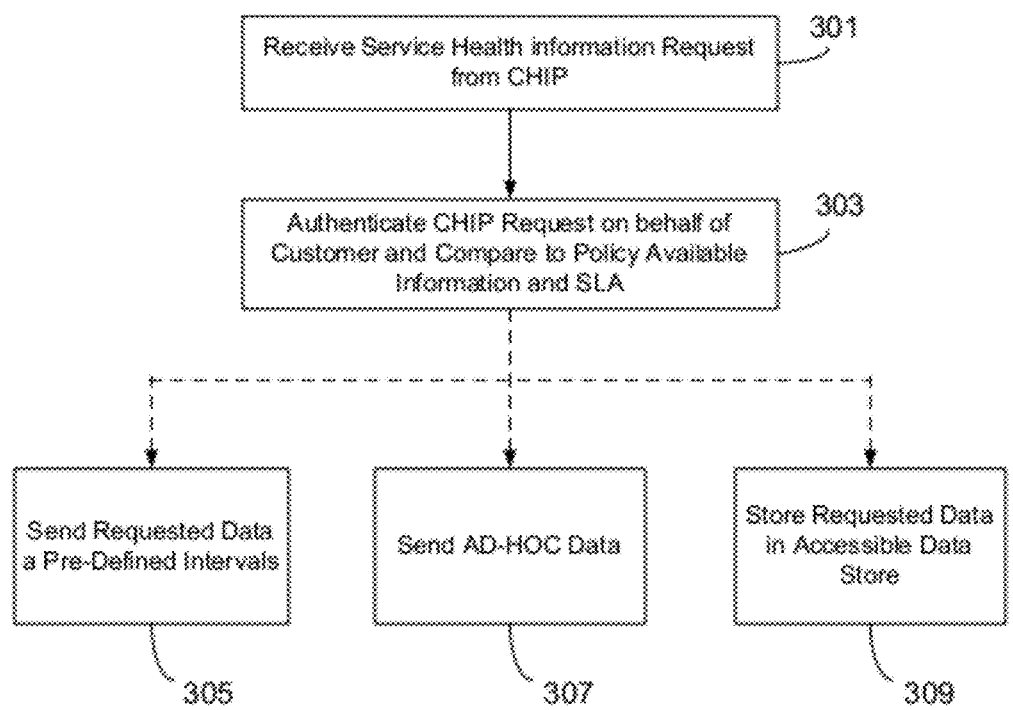
FIG. 3 is a flow diagram illustrating an exemplary method for providing service health information associated with a customer to a third party for aggregation, according to an embodiment of the invention.

FIG. 3 illustrates a flow chart of a method for providing service health data from the perspective of a cloud provider, according to embodiments of the invention. The cloud provider receives a service health information request from a cloud health information provider (CHIP), in block 301. Depending on the type(s) of information requested, customer agreements and agreement with the CHIP, this request may take the form of a transmitted message from the CHIP, or might be set in cloud provider policy once the customer and CHIP provider agreements are entered. In some embodiments, the cloud provider may be the same entity as the CHIP. The cloud provider may authenticate the request and send various subsets of information based on policies based on the agreements between the provider and customer and also provider and CHIP, in block 303. These agreements may predetermine the types of information which will be released (made available) to the CHIP, and the periodicity or granularity of information made available.

Depending on the method implemented between cloud provider and CHIP, the requested data may be (a) transmitted to the CHIP at defined intervals in block 305; sent only to the CHIP on an ad-hoc basis after each request, in block 307; or (c) stored in a data store accessible to the CHIP at a predefined location, in block 309. Other methods of delivery may be used, as necessary.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A computer implemented method, comprising:
    receiving a service health information collection request from at least one customer;
    authenticating the customer and the collection request;
    checking a policy and an agreement corresponding to the collection request, and setting parameters for the collection request based at least in part on said policy corresponding to said collection request, said agreement corresponding to said collection request, or a combination thereof;
    retrieving service health information corresponding to a plurality of service providers, wherein each of the plurality of service providers provides a computing service to the at least one customer over a network;
    aggregating service health information retrieved from the plurality of service providers into aggregated service health information;
    analyzing, according to said parameters, the aggregated service health information to produce an analysis result; and
    providing a service health report including the aggregated service health information and the analysis result to the at least one customer;
    wherein one or both of the receiving a collection request and authenticating the customer are inherent in a policy derived from a service level agreement with the customer; and
    wherein varying levels of service health information are retrieved for a customer based on a pre-determined policy.

2. The method as recited in claim 1, further comprising:
    providing a recommendation to the customer regarding at least one of a modification of a computing service or a change of providers for a computing service, wherein the recommendation is based on said result of said analyzing said aggregated service health information.

3. The method as recited in claim 1, wherein the customer request defines at least one of a collection and analysis period, a collection start time, a collection end time, and an indicator of types of service health information to be included in the service health report.

4. The method as recited in claim 1, wherein the service health report includes an advertisement for at least one of a computing service and a service provider.

5. The method as recited in claim 1, wherein retrieving service health information further comprises:
    requesting the service health information from each of the plurality of service providers; and
    receiving the requested the service health information from each of the plurality of service providers.

6. The method as recited in claim 5, wherein receiving the requested service health information further comprises at least one of (a) receiving transmission of the requested information, and (b) retrieving the requested information from a data store also accessible to the service provider.

7. A computer implemented system for collecting and aggregating service health information, comprising:
    a customer request component configured to:
        receive a collection request from at least one customer based at least in part on a policy derived from a service level agreement with said at least one customer and authenticate said collection request based in part on said policy derived from a service level agreement with said customer;
        check a policy and an agreement corresponding to the collection request;
        set parameters for the collection request based at least in part on said policy corresponding to the collection request, said agreement corresponding to the collection request, or a combination thereof;
    a service health information collector configured to:
        retrieve service health information associated with at least one of a plurality of service providers the at least one service provider providing one or more computing services to the at least one customer;
    a service health analysis and correlation engine configured to aggregate service health information retrieved from said at least one of said plurality of service providers into aggregated service health information, and to analyze the aggregated service health information in accordance with said parameters to produce an analysis result; and
    a service information router configured to provide report containing said aggregated service health information and said analysis result to said at least one customer;
    wherein said aggregated service health information comprises varying levels of service health information that are retrieved for said customer based on a pre-determined policy.

8. The system as recited in claim 7, wherein the service health analysis and correlation engine is further configured to provide recommendations to a customer for at least one of a modification of computing services and a change of service provider, the recommendation based in part on an analysis of the retrieved service health information associated with the customer.

9. The system as recited in claim 7, wherein the customer request component is configured to accept requests for any of:

continuous collection, ad-hoc collection, collection on and off requests, historical data within a specified time period, and requests for a subset of available metrics.

10. The system as recited in claim 7, wherein the service information router is configured to provide an advertisement for at least one of a computing service and a service provider, to at least one customer.

11. The system as recited in claim 7, wherein the service health information collector is configured to retrieve service health information by sending a request to at least one of the plurality of service providers for service health information associated with a customer, and then receive the requested service health information from the at least one of the plurality of service providers.

12. The system as recited in claim 11, wherein receiving the requested service health information further comprises at least one of (a) receiving transmission of the requested information, and (b) retrieving the requested information from a data store also accessible to the service provider.

13. A computer implemented system for providing service health data to customers, by a cloud service provider, comprising:
means for providing a cloud service to a plurality of customers, over a network;
means for receiving and authenticating a service health information collection request from one customer of said plurality of customers based at least in part on a policy derived from a service level agreement with said customer;
means for checking a policy and an agreement corresponding to the service health data collection request received from said customer and setting one or more parameters for collecting service health data associated with said collection request;
means for collecting service health data corresponding to at least one cloud service provided to at least one customer in accordance with said one or more parameters; and
means for providing the collected service health data to a cloud service health sensor unit, wherein the collected service health data includes varying levels of service health information that are retrieved for the customer based on a pre-determined policy, and is in a format capable of being accessed over the network by an authorized cloud health information provider for analysis and aggregation with other service health data corresponding to the customer in accordance with said parameters, but also corresponding to other cloud services used by the customer.

14. The system as recited in claim 13, wherein the cloud service provider and the cloud health information provider are the same entity, for the customer.

15. The system as recited in claim 14, wherein the cloud service provider and the cloud health information provider are different entities, for another customer of the plurality of customers.

16. The system as recited in claim 13, wherein the service health data provided for the customer varies in periodicity of collection, granularity, robustness, and completeness based on at least one of: a service level agreement between the cloud service provider and the customer, the collection request; a service level agreement between the cloud service provider and the cloud health information provider, and a local service health information policy.

17. The system as recited in claim 16, wherein the provided service health data includes an advertisement for possible services available to the customer.

18. The system as recited in claim 13, further comprising:
the cloud service health sensor unit coupled to a storage device for storing collected service health data.

19. The system as recited in claim 18, wherein the storage device is accessible to at least one authorized cloud health information provider.

20. The system as recited in claim 19, wherein the storage device is accessible for storing service health data collected by a second cloud service provider.

21. A computer implemented method, comprising:
receiving a service health data collection request from a customer based at least in part on a policy derived from a service level agreement with said customer;
authenticating the service health information collection request based at least in part on the policy derived from a service level agreement with said customer
checking a policy and an agreement corresponding to the collection request, and setting parameters for the collection request based at least in part on said policy corresponding to the collection request, said agreement corresponding to the collection request, or a combination thereof;
collecting, with a cloud service provider providing at least one cloud service the customer over a network, service health data corresponding to the at least one cloud service in accordance with said parameters;
providing collected service health data to a cloud service health sensor unit, wherein the collected service health data includes varying levels of service health information that are retrieved for the customer based on a pre-determined policy, and is in a format capable of being accessed over the network by an authorized cloud health information provider for analysis and aggregation in accordance with said parameters, with other service health data corresponding to the customer, but also corresponding to other cloud services used by the customer.

22. The method as recited in claim 21, wherein service health data provided for the customer varies in periodicity of collection, granularity, robustness, and completeness based on at least one of: a service level agreement between the cloud service provider and the customer, a customer's request for data; a service level agreement between the cloud service provider and the cloud health information provider, and a local service health information policy.

23. The method as recited in claim 21, further comprising:
receiving an information request corresponding to the customer; and
modifying a level of the provided service health data based on the information request.

24. A non-transitory tangible computer readable storage medium having instructions stored thereon, the instructions when executed on a machine cause the machine to:
receive a service health information collection request from a customer based at least in part on a policy derived from a service level agreement with said customer;
authenticate the customer and the collection request based at least in part on the policy derived from a service level agreement with said customer;
check a policy and an agreement corresponding to the collection request, and set parameters for the collection request based at least in part on said policy corresponding to the collection request, said agreement corresponding to the collection request, or a combination thereof;
retrieve service health information corresponding to a plurality of service providers, wherein each of the plurality of service providers provides a computing service to the customer over a network;

aggregate service health information retrieved from the plurality of service providers into aggregated service health information;

analyze, according to said parameters, the aggregated health service information; to generate an analysis result and provide a service health report including the aggregated service health information and said analysis result to a customer wherein said aggregated service health information comprises varying levels of service health information that are retrieved for said customer based on a pre-determined policy.

25. The medium as recited in claim 24, wherein the collection request defines at least one of a collection and analysis period, a collection start time, a collection end time, and an indicator of types of service health information to be included in the service health report.

26. The medium as recited in claim 24, wherein retrieving service health information further comprises instructions to:
   request the service health information from each of the plurality of service providers; and
   receive the requested the service health information from each of the plurality of service providers.

27. A non-transitory tangible computer readable storage medium having instructions stored thereon, the instructions when executed on a machine cause the machine to:
   receive a service health collection request from a customer based at least in part on a policy derived from a service level agreement with said customer;
   authenticate the customer and the service health collection request based at least in part on the policy derived from a service level agreement with said customer
   check at least one of a policy and an agreement corresponding to the collection request, and set parameters for the collection request based at least in part on said policy corresponding to the collection request, said agreement corresponding to the collection request, or a combination thereof;
   collect, with a cloud service provided providing at least one cloud service to the customer over a network, service health data corresponding to the at least one cloud service in accordance with said parameters;
   provide collected service health data to a cloud service health sensor unit, wherein the collected service health data includes varying levels of service health information that are retrieved for the customer based on a pre-determined policy, and is in a format capable of being accessed over the network by an authorized cloud health information provider for analysis and aggregation in accordance with said parameters, with other service health data corresponding to the customer, but also corresponding to other cloud services used by the customer.

28. The medium as recited in claim 27, wherein said service health data provided for the customer varies in periodicity of collection, granularity, robustness, and completeness based on at least one of: a service level agreement between the cloud service provider and the customer, the customer's request for data, a service level agreement between the cloud service provider and the cloud health information provider, and a local service health information policy.

29. The medium as recited in claim 27, further comprising instructions to:
   receive an information request corresponding to the customer; and
   modify a level of the provided service health data based on the information request.

\* \* \* \* \*

UNITED STATES PATENT AND TRADEMARK OFFICE
CERTIFICATE OF CORRECTION

PATENT NO.         : 8,843,618 B2                                Page 1 of 1
APPLICATION NO.    : 12/954366
DATED              : September 23, 2014
INVENTOR(S)        : Hong Li It is certified that error appears in the above-identified patent and that said Letters Patent is hereby corrected as shown below:

In the Claims

In column 10, line 52, In Claim 7, after "provide" insert -- a --.

In column 12, line 24, In Claim 21, after "service" insert -- to --. (1st occurrence)

In column 13, line 33, In Claim 27, delete "customer" and insert -- customer; --, therefor.

In column 14, line 5, In Claim 27, delete "provided providing" and insert -- providing --, therefor.

Signed and Sealed this
Twenty-seventh Day of January, 2015

Michelle K. Lee
*Deputy Director of the United States Patent and Trademark Office*